United States Patent
Wang et al.

(10) Patent No.: US 6,869,132 B2
(45) Date of Patent: Mar. 22, 2005

(54) CROSS-CAR BEAM SYSTEMS

(75) Inventors: Jenne-Tai Wang, Troy, MI (US); Gary Lee Jones, Farmington Hills, MI (US); James E. Williamson, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 51 days.

(21) Appl. No.: 10/392,337

(22) Filed: Mar. 18, 2003

(65) Prior Publication Data

US 2004/0183337 A1 Sep. 23, 2004

(51) Int. Cl.[7] .................................................. B60N 2/42
(52) U.S. Cl. ......................... 296/187.12; 296/187.06; 296/187.08; 296/68.1; 297/216.1
(58) Field of Search ..................... 296/187.03, 187.08, 296/187.06, 187.07, 187.12, 203.03, 193.07, 187.05, 193.02, 193.05, 35.1, 35.2, 68.1, 65.02; 297/216.1, 216.13, 216.14

(56) References Cited

U.S. PATENT DOCUMENTS

| | | | | |
|---|---|---|---|---|
| 2,624,613 A | * | 1/1953 | Parmely | 296/68.1 |
| 4,231,607 A | * | 11/1980 | Bohlin | 296/63 |
| 5,954,390 A | | 9/1999 | Kleinhoffer et al. | |
| 6,237,991 B1 | | 5/2001 | Weber | |
| 6,299,238 B1 | * | 10/2001 | Takagi et al. | 296/187.12 |
| 6,299,239 B1 | * | 10/2001 | Sagawa et al. | 296/187.12 |
| 6,401,565 B1 | | 6/2002 | Wang et al. | |
| 6,422,631 B1 | * | 7/2002 | Schmidt et al. | 296/68.1 |
| 6,592,166 B2 | * | 7/2003 | Motozawa | 296/68.1 |
| 6,644,723 B2 | * | 11/2003 | Motozawa | 296/65.12 |
| 2002/0153749 A1 | * | 10/2002 | Lee | 296/204 |

* cited by examiner

Primary Examiner—D. Glenn Dayoan
Assistant Examiner—Patricia Engle
(74) Attorney, Agent, or Firm—Kathryn A. Marra (57) ABSTRACT

A beam system of telescoping tubes is used for absorbing side impacts to a passenger vehicle. A central outer tube is attached to a vehicle seat structure and extends between, e.g., a side door and the tunnel in the passenger compartment floor. Inner tubes in each end of the outer tube are moved between retracted positions to extended positions respectively engaging said tunnel and said door during vehicle operation. Each inner tube has a tapered piston carrying rolling elements for wedging against the outer tube for energy absorption upon a side impact.

15 Claims, 5 Drawing Sheets

CROSS-CAR BEAM SYSTEMS

TECHNICAL FIELD

This invention pertains to cross-car beam systems for absorbing energy during an impact to the side of a vehicle. More specifically, this invention pertains to energy absorbing beam systems comprising telescoping tubes in which the force of an impact drives and wedges an inner tube with a conical piston-retained ball assembly into an outer tube.

BACKGROUND OF THE INVENTION

Designs have been proposed for cross vehicle beams for absorbing impacts to the side of a passenger compartment. It is an object of this invention to provide deployable (including extendable/retractable) telescoping tube beam systems for this purpose. It is a more specific object of this invention to provide such a telescoping tube beam system that uses a conical piston-retained ball mechanism in energy absorption. It is a further object of this invention to provide a method of operating an extendable/retractable embodiment of such deployable beam systems.

SUMMARY OF THE INVENTION

The extendable/retractable and deployable tubular beam systems of this invention are adapted to be attached to the underside or back of the front seats of the vehicle and, in their extended or deployed position, to bear against the driver and passenger side doors or body pillars (the B-pillar in automotive body terminology). In one embodiment, a full cross-car beam system spans the width of the passenger compartment. It may be used, for example, with a bench type front seat. Another embodiment may be used in vehicles with separately adjustable seats and in which the floor of the passenger compartment has a tunnel for an underlying exhaust system or drive shaft. Here two shorter tubular beam systems may be used extending from opposite sides of the tunnel structure to the adjacent door or body pillar. Each such tunnel to door system may be considered a cross-car half-beam system and the two half-beam systems can be identical. Since many automotive vehicles have a structurally strong floor tunnel in the passenger compartment, a half beam system will be described in this summary.

In a preferred embodiment, each half-beam system comprises a central outer tube, circular in cross-section, with like shaped telescoping inner tubes at each end. The central outer tube is suitably attached to a front seat structure so as to permit seat adjustment by an occupant. The central tube typically spans the width of the seat. Attached to the outer end of each inner tube is a suitable plate or disk. In the case of the outboard inner tube, the plate or disk is adapted for pressure engagement with a door or B pillar structure in the extended position of the inner tubes. The plate on the inboard inner tube will engage a side of the floor tunnel structure in the extended position of the half-beam system.

The extension/retraction (E/R) function of the E/R beam system comprises pulling the inner tubes into the ends of the central outer tube to a retracted position for storage when the system is not needed and pushing the inner tubes part way out the respective ends of the outer tube to their extended positions against the tunnel (inboard tube) and door or pillar (outboard tube) during vehicle operation. The E/R function of the inner tubes is suitably accomplished using, for example, an electric actuator, e.g., a motor located at the midpoint of the length of the outer tube. A connector(s) extends from the actuator in both directions in the outer tube to the inner ends of the inner tubes. A lead screw or other suitable mechanical linkage with the inner tubes provides this connector function. As will be described, the electric actuator is operated to extend the inner tubes, for example, when the vehicle is being operated and the seat is not being moved. The actuator withdraws the inner tubes when the seat is to be moved or vehicle operation has ended. Thus, both tubes are moved at the same time but they do not necessarily travel the same distance.

An important feature of the invention is the energy absorbing connection between the inner tubes and outer tube-that operates when the beam system is in its extended position and experiences a significant impact that pushes the door or B-pillar against the end of the outboard inner tube. In a preferred embodiment, a conical piston assembly is attached to the inner end of each inner tube. One function of the piston is to act as the attachment point for the connectors from the E/R actuator or as the reaction surface for pyrotechnic extension of the inner tubes. But the piston also contributes to the energy absorbing function of the beam. Each piston extends inwardly away from the end of its inner tube along the axis of the central outer tube. The circumferential surface of the piston is tapered like a truncated cone. Hardened steel balls are retained on the conical surface in spaced relationship around the circumference of the tapered piston body. In normal electric motor actuated extension and retraction operation of the system, the balls lie loosely on the conical surface in non-interfering relationship with the outer tube. But upon a side impact to the vehicle, the extended outboard inner tube is suddenly driven into the outer tube. The inertia of the balls carries them up the surface of the inwardly deflected conical piston and they become wedged between the piston and the inside of the outer tube. If the side impact is strong enough the outer tube may be driven over the inboard inner tube and the balls in that piston will also be wedged against the inboard end of the outer tube.

The level of the locking force is dependent upon parameters such as the size, number and hardness of the balls, the thickness, hardness and strength of the outer tube material, the slope of the piston surface and the gap between the piston and the outer tube. It is contemplated that two different energy absorption modes can be achieved using the piston and ball locking mechanism. In one mode, the balls wedge against the outer tube and prevent further telescoping of the inner tube into the outer tube. In this mode the side impact energy first crushes the outboard inner tube. In a second mode, continued movement of the inner tube into the outer tube causes the balls to deform the outer tube and perhaps the surface of the piston thus absorbing energy of the impact. In each mode the force of a side impact is transferred to the tunnel structure of the vehicle. As stated the design of the telescoping system and the physical properties of the tube and piston elements affect how the energy of a side impact is distributed among the elements of the system and the vehicle body. The energy absorbing function of the piston assembly is effective even if the inner tube has not been fully extended.

In a second embodiment the beam is a deployable device normally in its stored position, it does not repeatedly extend and retract. A pyrotechnic charge is used in place of the two-way electric motor. When a crash sensing system in the vehicle detects the onset of side impact it actuates the pyrotechnic to release high pressure gas. The expanding gas flows toward each end of the outer tube and drives the piston of each inner tube outwardly. The inner tubes are thus deployed in their extended position. The impact immediately acts on at least the outboard inner tube to drive it back into the inner tube. The balls on the conical surface of the piston are wedged against the outer tube in an energy absorbing mode like that described for the E/R system.

Other objects and advantages of the invention will become more apparent from a detailed description of a preferred embodiment which follows.

DESCRIPTION OF A PREFERRED EMBODIMENT

Figure 8:
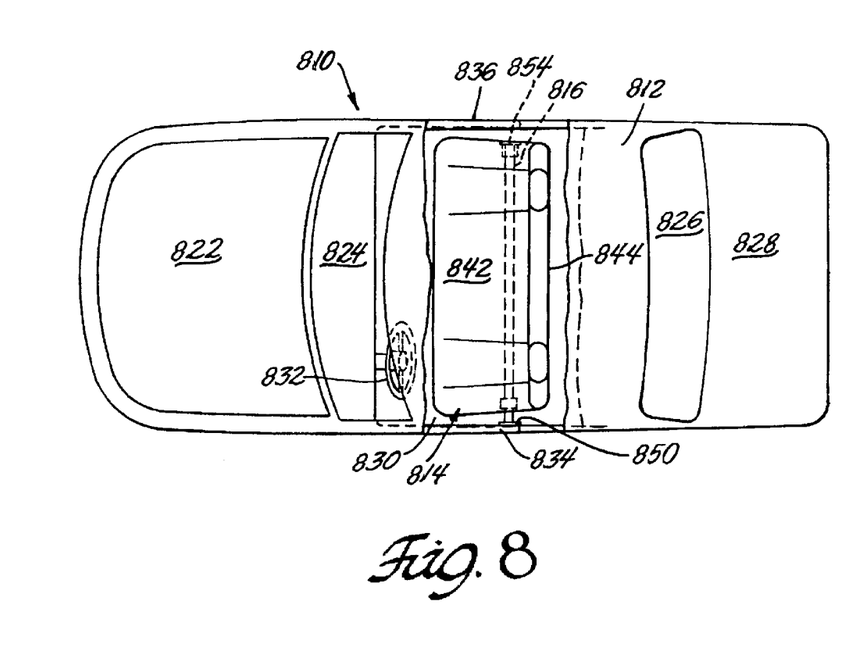
FIG. 8 is a schematic plan view of the interior of a passenger vehicle showing an alternate extendable/retractable cross-car beam.

The practice of this invention may utilize a cross-car beam that is attached to the back or under structure of a bench-type operator seat and front passenger seat and extended the full width of the vehicle from one side door to the opposite side door as seen in FIG. 8. However, many vehicle bodies have a tunnel structure built into the floor of the passenger compartment with separately adjustable front seats located on opposite sides of the tunnel. In such vehicle body constructions a shorter beam, about half the length of a full cross-car beam can be used. Each half length beam is structurally similar to a full cross-car beam and may function in a like manner. One end of each half length beam is adapted to bear against the sheet metal structure of the tunnel and the other end against a structural member of an adjacent door or body pillar. Typically the impact beams are circular tubes with telescoping, energy absorbing end members that are stored in a retracted position and simultaneously extended into engagement with the tunnel and door or B-pillar prior to or during a side impact.

The practice of the invention will be illustrated in the form of two half cross-car length beam embodiments. One embodiment is an extendable and retractable beam embodiment in which the telescoping side impact energy absorbing mechanism is extended by the use of an electric motor whenever the car is in operation and the seat to which the device is attached is not being adjusted in its fore-aft position. There is a second embodiment of the invention in which the cross-car beam is normally in a stored or retracted position and is deployed only during a side impact. Current vehicles typically have accelerometer based impact detection systems for frontal and side impacts. Upon detection of a side impact requiring energy absorption, an energy absorbing beam system of this invention is instantaneously deployed by the use, for example, of a pyrotechnic charge.

Figure 1:
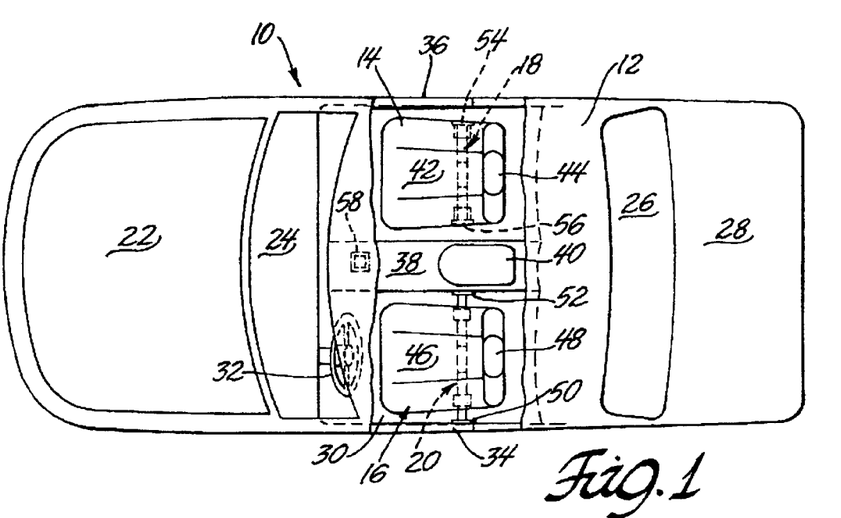
FIG. 1 is a schematic plan view of the interior of a passenger vehicle showing the location of extendable/retractable cross-car half beams under the two front seats.

FIG. 1 is a plan view of a typical automotive vehicle 10 looking through a broken-away section of roof 12 into the passenger compartment at two front seats 14, 16 that have been provided with half cross-car length beams 18, 20 in accordance with a preferred embodiment of this invention. Beams 18, 20 are shown in schematic outline in FIG. 1. Seat 16 is the operator's seat situated behind steering wheel 32 and next to side door 34. Seat 14 is a passenger seat adjacent passenger side door 36. Vehicle 10 further comprises a hood 22 covering a forward engine compartment, front window 24, rear window 26 and a rear portion 28 typically enclosing a trunk. The floor 30 of the passenger compartment body includes a central fore/aft tunnel structure 38 to accommodate an underlying drive shaft for the rear wheels or an exhaust system or the like. A storage console 40 may also be located above tunnel 38 between seats 14 and 16.

Tunnel 38 separates the driver seat 16 and passenger seat 14. Typically, seats 14, 16 are mounted on support rails or the like, not shown, so that the fore/aft location of each seat can be individually adjusted for passenger comfort. Each seat 14, 16 comprises a generally horizontal seat cushion 42, 46 and upright back 44, 48 respectively. The seats are suitably attached to the seat rails or other supporting mechanism by known means which are not necessarily altered by the practice of this invention. Preferably, the side impact absorbing beams 18 and 20 of this invention are attached to the seat structure below and/or behind the seat cushion (42 for seat 14 and 46 for seat 16). Impact beams 18 and 20 are illustrated as attached to the support mechanisms for seats 14 and 16 below their respective cushions 42, 46. Thus, beams 18 and 20 move fore or aft in the passenger compartment as the position of their respective seats 14, 16 may be adjusted by a user.

Half car width beam system 20 affixed to the operator's seat 16 is illustrated in its extended position in which its outboard end plate 50 engages vehicle side door 34 and its inboard end plate 52 engages a suitable structural portion of the tunnel 38. The passenger seat 14 half-width beam 18 is shown in its retracted position with its outboard end plate 54 adjacent to, but not touching, vehicle door 36 and its inboard end plate 56 closely spaced, but not touching, the passenger seat side of vehicle tunnel 38. In this specification, "outboard" refers to the end of a beam member closest to the outside of the vehicle and "inboard" to the opposite direction.

Impact energy absorbing beams 18 and 20 comprise telescoping tubular beam end members that are extended and retracted together in an outer tube beam in a manner which will be described. Such deployment or motion is managed by a suitable control module system. For purposes of illustration a control module 58 is shown schematically at the tunnel structure 38. Impact detecting systems for activating motor vehicle passenger compartment devices are known and used, for example, to activate supplemental inflatable restraints (i.e., air bags) located, e.g., in the steering wheel, instrument panel side doors and the like. Accelerometers or other suitable impact detectors are located to detect an impact on the vehicle from a specified direction and the control module processes signals from the sensors to activate a device as required. Such a system may be used for onetime deployment of beams 18, 20, or for repeated extension and retraction of the beams. Both practices will be described after the beams are described.

Figures 2, 4:
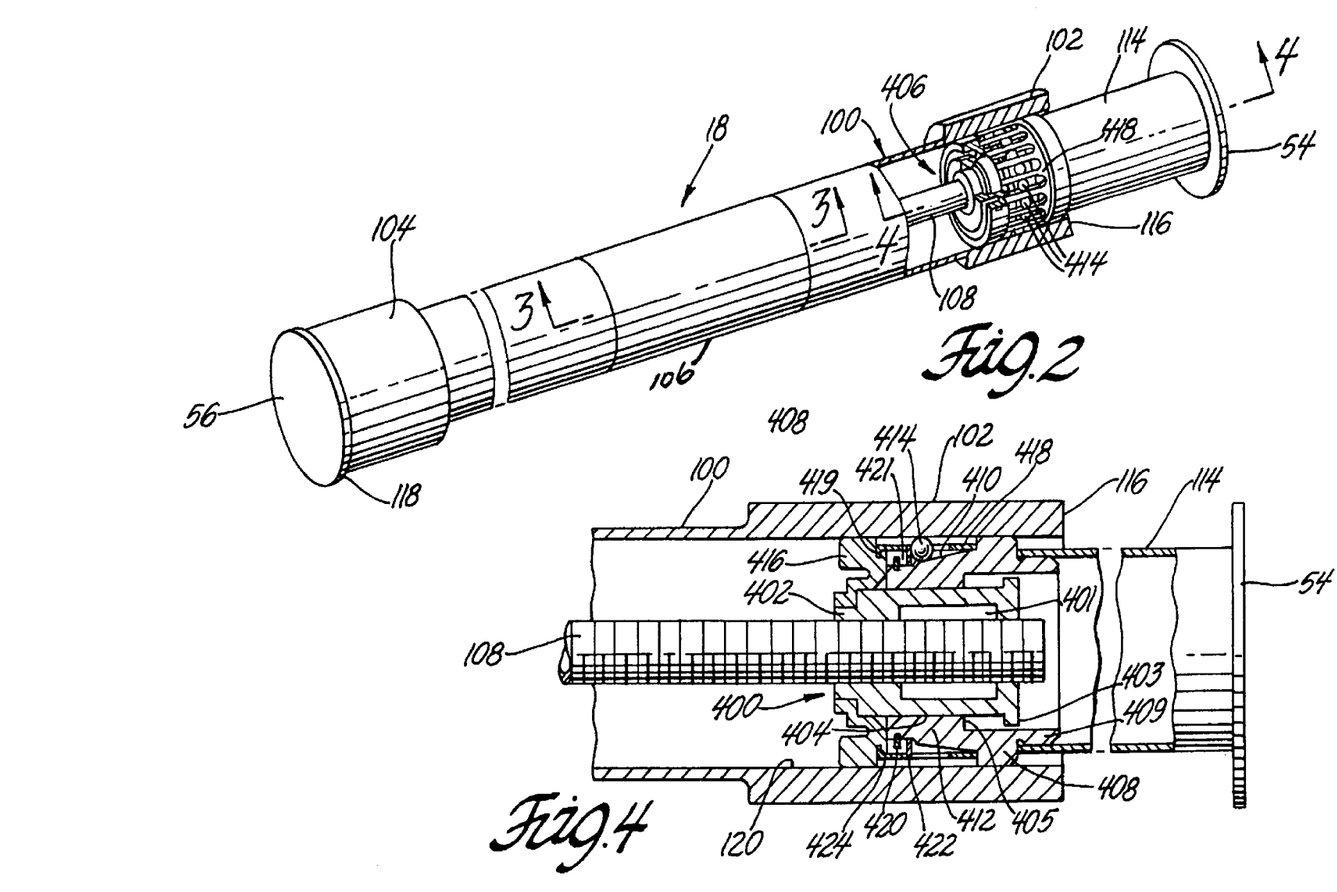
FIG. 2 is an oblique view, partly in section and partly broken away, of an extendable/retractable cross-car half beam system. For purposes of illustration only, the inner tube at one end is shown in its retracted position and the other inner tube is shown in its extended position. In normal operation of the beam system both tubes would be extended or retracted at the same time.
FIG. 4 is an enlarged, fragmentary view taken at 4—4 of FIG. 2 showing the telescoped inner and outer tubes and the piston/ball locking system.
Figure 3:
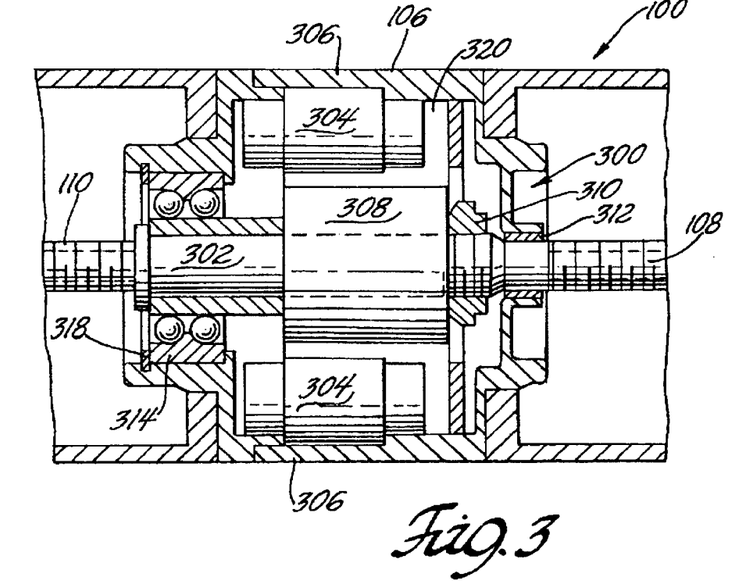
FIG. 3 is an enlarged, sectional, fragmentary view taken at 3—3 of FIG. 2 showing the central portion of the outer tube showing an electric motor and shaft which serves as the extending and retracting mechanism.

The extendable/retractable half cross-car width beams 18, 20 are shown only in outline in FIG. 1. Beams 18, 20 may be of the same construction. Reference is had to FIGS. 2 through 4 for a description of representative beam 18. Beam 18 comprises an outer tube 100 with a first radially enlarged portion 102 at its outboard end 116 and a like radially enlarged portion 104 at inboard end 118. Outer tube 100 comprises a central section 106 within which is located an electric actuator, typically a reversible electric motor 300 (FIG. 3). Motor 300 comprises a central two-way rotatable drive shaft 302. Attached to the opposite ends of drive shaft 302 are co-axial lead screws 108 and 110. Lead screws 108 and 110 are driven by motor 300 and extend in opposite directions along the axis of the outer tube 100. Lead screw 108 extends through outboard piston assembly 400 at the inboard end of outboard inner tube 114. Lead screw 10 extends to a like piston assembly and inner tube enclosed and hidden within the inboard end 118 of outer tube 100. Outboard inner tube 114 and the unseen inboard inner tube both telescope into the respective ends of outer tube 100. The rotational direction of electric motor 300 and the threading of the lead screws 108 and 110 simultaneously drive the respective piston assemblies and attached inner tubes between their retracted position (shown in FIG. 2 only at the inboard end 118 of outer tube 100) to their extended position shown in FIG. 2 at the outboard end 116 of outer tube 100 with piston assembly 400 and attached inner tube 114. The pitch of the threads on lead screws 108 and 110 is specified to advance the respective inner tubes the necessary distances to engage the adjacent tunnel or body structure.

FIG. 3 illustrates schematically and in cross section electric motor 300 which is fixed within a central section 106 of outer tube 100. Motor 300 has an electrical lead, not shown, through which electrical current is delivered to the motor upon command of control module 58. In this extendable/retractable function of impact beam 18, control module is programmed in accordance with the algorithm illustrated in FIG. 5.

Referring to FIG. 3, electric motor 300 comprises an outer annular motor stator 304 carried in support housing 306 which is part of center portion 106 of outer tube 100. Located radially within stator 304 is the rotor 308 for motor 300. Rotor 308 contains and drives rotor shaft 302 and is fixed to it by retainer nut 310 at the right end of shaft 302 as seen in FIG. 3. As stated above, the right end of rotor shaft abuts and drives lead screw 108. The right end of rotor shaft 302 is supported in bushing 312. The left end of rotor shaft 302 is supported bearing assembly 314. Bearing assembly 314 is held within motor support housing 306 by bearing retainer 318. Motor 300 has a position sensor 320 which provides motor rotation data to control module 58 in controlling the E/R function of beam 18.

As illustrated in FIG. 4, the outboard end of outboard inner tube 114 has a disk 54 or pressure plate that is adapted to engage against a structural portion of vehicle door 36. The inboard end of beam 18 has a like plate 56 at the inboard end of the inboard inner tube which is illustrated in the retracted position and telescoped and hidden within end 118 of outer tube 100. However, in the extended position of the beam, with inboard inner tube in its extended position, plate 56 would bear against the tunnel structure 38 of the vehicle body as described above in FIG. 1.

Referring to FIG. 2, piston assembly 400 and attached inner tube 114 are seen to telescope within the inner diameter of outer tube 100 of beam 18. As described, the extended/retracted (E/R) position of piston assembly 400 and inner tube 114 are altered in response to the rotation of motor 300 and lead screw 108 upon the command of control module 58. The inboard end of inner tube 114 is attached to piston assembly 400 which provides both the motive connection between lead screw 108 and inner tube 114 and an impact energy absorption capability for the beam 18.

A suitable piston assembly and attached tube for use in the practice of this invention is described in U.S. Pat. No. 6,401,565 entitled "Self-Locking Telescoping Device" and assigned to the assignee of this invention. The description of the piston assembly and attached tube and the method of their operation is incorporated into this specification to supplement the following description.

As shown in FIG. 4, piston assembly 400 comprises shuttle 402 carried on threaded nut 401. Nut 401 engages the threads at the end portion of lead screw 108 and is translated axially depending upon the direction of rotation of lead screw 108. Nut 401 is thus moved by rotation of lead screw 108 and carries with it shuttle 402. Attached to shuttle 402 is ring 416, and the combination of nut 401, shuttle 402 and ring 416 are used to extend and retract the whole piston assembly 400 and inner tube 114.

Piston body 406 has a round hollow portion 404 that fits loosely over the round external surface of shuttle 402 so that shuttle 402 can be axially translated within piston body 406. At the outboard end of piston body 406 is an annular base 408 that slides along the round inner surface 120 of outer tube 100. Inner tube 114 is attached to piston body 406 at cylindrical portion 409 outboard of annular base 408. Piston body 406 further comprises a round truncated conical portion 410 that tapers and narrows from annular base 408 in the direction inwardly from the outboard end 116 of outer tube 100. At the truncated end of conical portion 410 is a smaller annular end portion 412 shown to be next to ring 416 in FIG. 4.

Carried on the conical surface of conical portion 410 are several steel balls 414 which are separated from each other because they are retained in ball slots within ball retainer 418 (see FIGS. 2 and 4). The fingers of ball retainer 418 that define the slots for the balls 414 are crimped into an annular slot 419 in ring 416 at their inboard end. The outboard end of cylindrical retainer ring 418 loosely rests against piston 406. Retainer ring 418 is thus moved with ring 416 and shuttle 402.

Balls 414 are confined by the ball retainer 418 and thrust washer 422 loosely fitted over the inboard end 412 of piston 406. Retainer ring 420 is anchored in end 412 of piston 406. An annular wave plate spring (not shown to simplify illustration) is located at 421 between retainer ring 420 and thrust washer 422. During the retraction action of motor 300 and lead screw 108 the nut 401, shuttle 402, ring 416 and ball retainer 418 are drawn into outer tube 100. The annular outboard ring 403 on shuttle 402 moves to the left and soon engages inner surface 405 of piston 406 and pulls piston 406 and inner tube 114 into outer tube 100 until plate 54 abuts the end 116 of outer tube portion 102. This is the retracted position of beam 18. During the retraction motion of the lead screw 108 and piston assembly 400, balls 414 are pulled by the closed end of the ball retainer 418 against thrust washer 422, wave spring and retaining ring 420. In this way the balls 414 are prevented from rolling up the conical surface and wedging against the inside surface of outer tube 100.

During an extension motion of lead screw 108 the directional movement of nut 401, shuttle 402 and ring 416 is reversed. Ring 416 then pushes against piston body 406 and moves it toward the open end of inner tube 100. Ball retainer 418 is pushed against the conical surface of piston 406. Inertia and friction keep the balls at the small end of the conical piston and out of engagement with the outer tube 100, When the inner tube 114 is in its extended position, plate 54 is pressed against a door or pillar structure. An impact on the side of the vehicle that deflects the door or pillar structure against plate 54 drives the inner tube 114 into outer tube 100. The inclined piston body 406 is also driven into the enlarged portion 102 of outer tube 100 but the inertia of the loose balls carries them up conical surface and wedges them into surface 120 of outer tube 100. The balls 414 plow into and deform inner surface 120 absorbing energy from the side impact to the vehicle. The impact will push on plate 54 of the inner tube 114 and drive the piston assembly 400 along the lead shaft 108, stripping its threads and along the inner diameter of the outer tube. As inner tube 114 is driven by the impact further inwardly along outer tube 100, the balls 414 will either lock the ramp portion 406 against the outer tube 100 to permit crushing of the outboard portion of the inner tube 114 or the balls 414 will continue to plow along the inside diameter 120 of outer tube 100. Either eventuality will absorb energy from the impact on the door slowing deformation of the door.

The inner tubes of the beam are held in their extended positions by control module 58 command so long as the vehicle is in normal operation. When normal operation ceases the inner beam tubes are simply withdrawn by the actuator to their retracted position and the door can be opened for the exit of the passenger or the operator.

Figure 5:
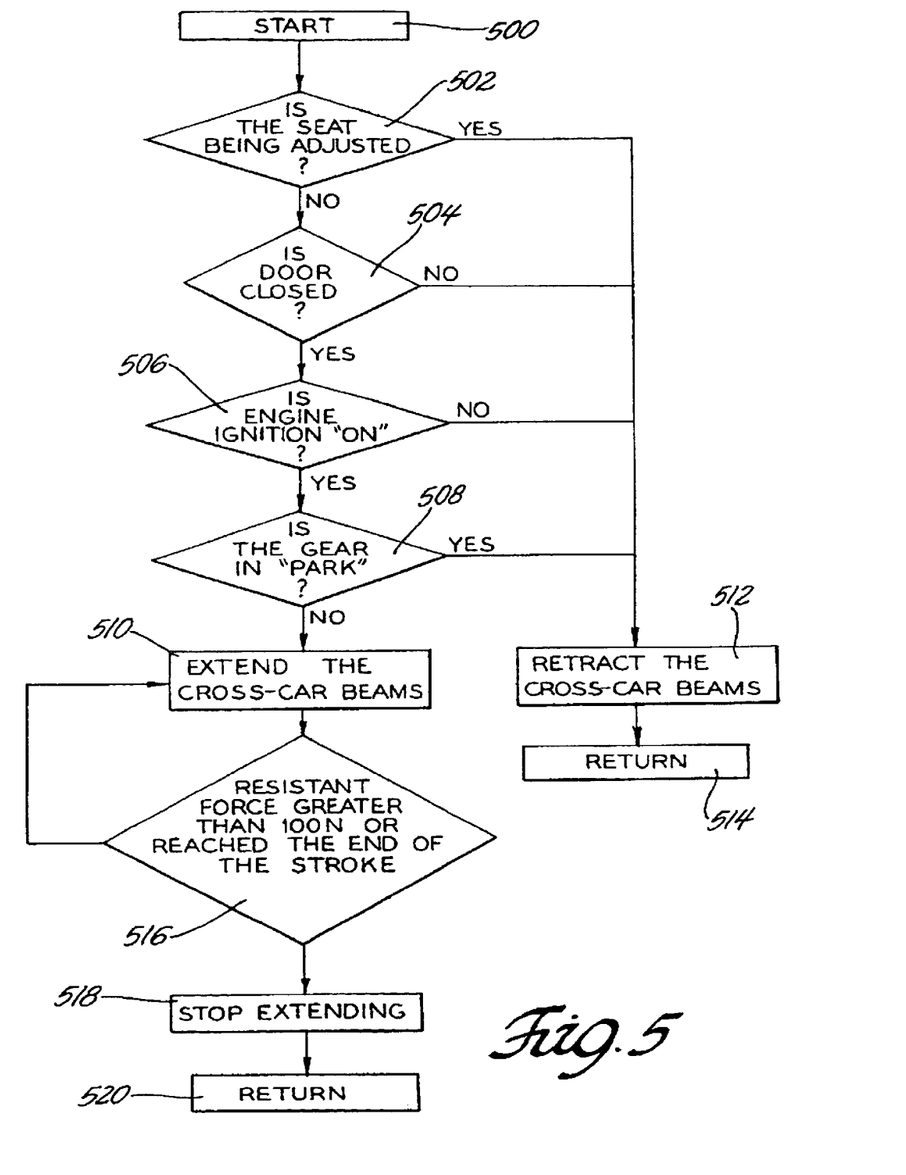
FIG. 5 is a flow diagram of a control algorithm for the extendable/retractable cross beam system.

FIG. 5 is a flow diagram illustrating an algorithm for controlling the extension and retraction of an impact absorbing beam structure of this invention. In the use of the E/R beam embodiment it is normally intended that the beam be in its extended position only when the vehicle is being driven and the passenger in a seat to which the beam is attached is not moving the seat. The method of FIG. 5 seeks to fulfill this intent. It is presumed that the algorithm would be executed on a suitably programmed, on-board microprocessor that is part of a control module for the E/R beam system. The microprocessor would cycle through the algorithm at appropriate intervals of, for example, one second.

The algorithm starts at block 500 and proceeds to inquiry block 502 in which it is determined whether the position of the seat to which an E/R beam is attached is then being adjusted. Vehicle seats are usually positioned by an occupant moving a mechanical release and pushing the seat to a comfortable position, or by use of an electrical motor. Either mode of movement can be detected by a suitable sensor. If the answer to the inquiry in block 502 is "yes," the beam will either be retained in its retracted position or then moved to its retracted position. The retraction of the beam is started by command box 512 and the processor proceeds to return block 514 for the next processing cycle. If the answer to the inquiry in block 502 is "no," the process proceeds to query block 504.

In inquiry block 504 the microprocessor determines whether the vehicle door is closed. Sensors are available and in use for this purpose. Again, if the door is open and the answer is "no", the beam is retained in its retracted position or moved to its retracted position, command box 512. But, if the answer is "yes", the process proceeds to the next query block 506. In query block 506, the processor determines whether the engine ignition is on. If the engine is not on, the beam is retracted or retained in its retracted position, command box 512. But if the engine ignition is on, the microprocessor proceeds to query block 508.

In query box 508 the microprocessor determines whether the transmission gear is in its "park" position. If the answer is "yes", the cross-car beam is retained in its retracted position, command box 512. At this stage of the determinations of the microprocessor, if the transmission is not in "park", the beam is extended to its side impact absorbing position by microprocessor command in block 510. From command block 510 the process proceeds to query block 516 in which the process cycles until it is determined that the beam has reached some resistance force, or has reached the end of its normal stroke. The purpose of query block 516 is to take care of the situation in which some impediment has been placed between the end of the cross-car beam and the end of its normal stroke. Finally, when the process has determined that the beam has reached the end of its extend stroke, the command block 518 stops the extension of the beam and the process reaches return block 520. Thus, the microprocessor cycles periodically during engine operation through this algorithm during vehicle operation to determine when it is appropriate to extend or retract the cross car beam. When the engine is turned off, the processor commands the retraction of the beam during the next processing cycle.

Figure 6:
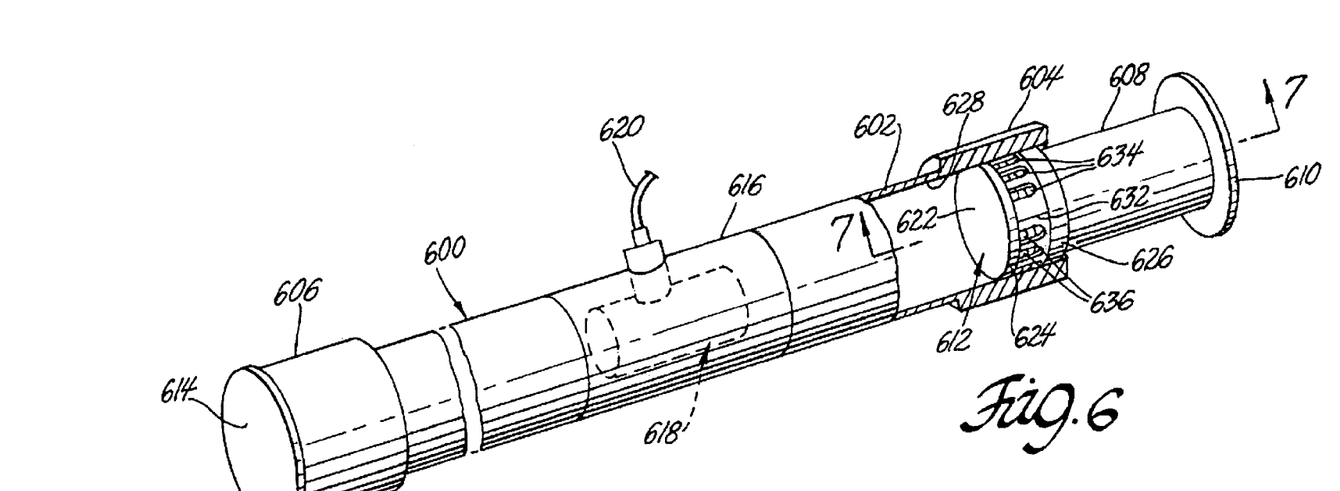
FIG. 6 is an oblique view, partly in section and partly broken away, of pyrotechnic device deployable cross-car half beam. As in FIG. 2, the inner tube at one end is shown in its retracted position and the other inner tube is shown in its extended position for purposes of illustration.
Figure 7:
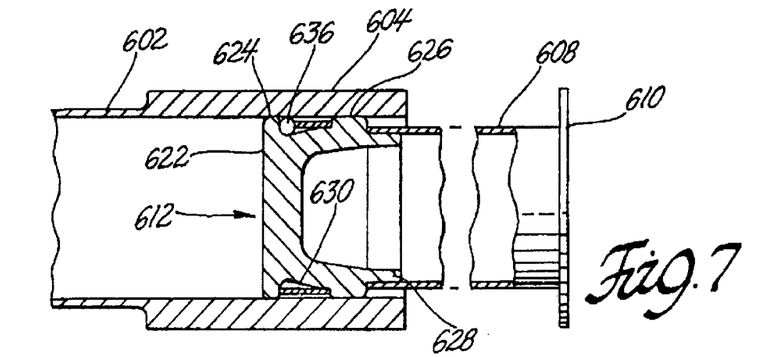
FIG. 7 is a fragmentary cross-sectional view taken at 7—7 of FIG. 6 showing the right end of the outer tube and the piston assembly and inner tube in their deployed position.

FIG. 6 is an oblique view, partly broken away and in section, of a relatively simple side impact absorbing beam system 600. Beam system 600 is intended to be extended and deployed only one time, when an impact has been sensed by a control module. FIG. 7 is a sectional view of the right end of beam system 600 taken at direction 7—7 of FIG. 6.

Beam 600 comprises an outer tube 602 with enlarged tube portion 604 at the right end as viewed in FIG. 6 and enlarged tube portion 606 at the left end. Telescoped within the sectioned right enlarged end 604 of outer tube 602 is an inner tube 608 with endplate 610 fixed to its outboard end. The inboard end of inner tube 608 is fixed to a piston assembly 610. For purposes of illustration inner tube 608 including its piston assembly 612 are shown in their deployed position. An inner tube, endplate and piston assembly of the same design are illustrated as telescoped within the left end enlarged portion 606 of outer tube 602. The left end tube and piston assembly are in their non-deployed position and are not visible within the un-sectioned end of the outer tube 602. But the endplate 614 for the hidden and stored left inner tube is visible against left enlarged end 606 of outer tube 602. In operation of beam 600 both inner tubes (608 and the hidden tube) would be stored within outer the outer tube 602 until they are simultaneously deployed.

Enclosed within the central portion 616 of outer tube 602 is a pyrotechnic device 618. Upon detection of a side impact by a vehicle module, pyrotechnic device 618 is ignited by a command through igniter lead 620 from the control module. The pyrotechnic device fires, generating high pressure gas that expands with deploying force against the piston assemblies of the right and left end inner tubes. As illustrated in the cross sectioned right end of FIG. 6 and the sectioned fragmentary view of FIG. 7 the expanding gas from device 618 pushes against piston surface 622 of piston assembly 612. The pressure drives both piston assemblies and inner tubes to their deployed position as illustrated only with the right end piston assembly 612 and inner tube 608.

The end portions 604, 606 of the outer tube 602 and the inner tubes (only 608 is illustrated) of deployable beam 600 may be of the same design as the corresponding member of the E/R beam 18 embodiment described above in this specification. However, the central portion of the outer tube, of course, contains pyrotechnic device 618 instead of a two-way electric motor, and piston assembly 612 may be of a simpler design than the piston assemblies of the E/R beams.

Piston assembly 612 has an inboard piston head portion 624 and an outboard base portion 626 both of which are round and sized to slide on the round inner surface 628 of outer tube 602. Both head portion 624 and base portion 626 cooperate to confine the high pressure gas within outer tube 602 so that it effectively pushes on piston surfaces, e.g., surface 622 in driving the inner tubes of the beam 600 to their deployed positions. Base 626 also has a smaller diameter or shoulder portion 628 to which inner tube 608 is securely attached. The outboard portion of piston assembly 612 is hollow for reduced mass.

Piston assembly 612 also comprises a conical surface 630 that tapers inwardly with respect to outer tube 602. A ball retainer 632 with a plurality of axial slots 634 is fitted over conical surface 630. Ball retainer 632 confines a steel ball 636 in each of its slots on the conical surface 630 and within the inner surface 628 of outer tube 602. Balls 636 are also retained by the head portion 624 of the piston assembly 612.

In the normal operation of deployable beam 600 both inner tube-piston assemblies are in their retracted positions. However, when a control module, e.g., 58 senses an impact on the side of the vehicle at which beam 600 is located, a signal is sent to ignite the pyrotechnic charge 618 and deploy the inner tube-piston assemblies outwardly against tunnel structure and a door structure.

Momentarily later, the impact acts, for example, on the right end inner tube plate 610. The force on impact plate 610 drives inner tube 608 and piston assembly 612 into outer tube 602. The inertial effect on the motionless balls 636 carries them up inclined ramp 630 and they wedge against the inside surface 628 of outer tube 602.

Depending upon the hardness of the material of the balls, the inner surface of the outer tube and the conical surface of the piston assembly different energy absorbing mechanisms can be achieved. For example, the balls can be made to wedge and lock against inner surface 628 of enlarged portion 604 of the outer tube 602. In this mode of beam operation, initial energy absorption results from the crushing of the immobile inner tube 608. In another example the surface 628 of the outer tube 604, 602 is softer or thinner and the balls 636 plow into and along surface 628 as the inner tube 608 is driven into the outer tube 602. The deformation of the outer tube 602 absorbs energy as may concurrent crushing of the inner tube 608. Of course the outboard inner tube 608 and piston assembly 612 will normally be affected first by the side impact. However, the inboard inner tube and piston assembly may also be likewise wedged and driven into the outer tube as impact force is transferred along the outer member of the beam against the floor tunnel structure.

The beam systems have been described as having two inner tube-piston assemblies inserted in opposite ends of an outer tube. However, there may be applications in which only one inner tube-piston assembly is used and it is placed at the impact receiving end of the beam system.

FIG. 8 is a plan view of an automobile vehicle 810 looking through a broken-away section of roof 812 into the passenger compartment at a bench seat 814 that spans the width of the passenger compartment. In this embodiment vehicle 810 has been provided with a full cross-car extendable/retractable beam 816. The full body width cross-car beam 816 is shown in schematic outline in FIG. 8 located under bench seat 814. Vehicle 810 also comprises a hood 822, front window 824, driver steering wheel 832, rear window 826 and a rear portion 828 enclosing a trunk. Bench seat 814 includes a generally horizontal seat cushion 842 and an upright back 844. The seat is suitably attached to a seat rail or other supporting mechanism on vehicle floor 830. Preferably, the cross-car side impact beam 816 is attached to the seat structure below and/or behind seat cushion 842. The driver side end of cross-car beam 816 is illustrated in its extended position with its outboard end plate 850 engaging driver-side door 834 or door frame. The passenger side end of cross-car beam 816 is shown in its retracted position with its outboard end plate 854 adjacent to, but not touching, passenger vehicle door 836.

The invention has been described in terms of certain preferred embodiments but, obviously, other embodiments can readily be devised by those skilled in the art.

What is claimed is:

1. A beam system for absorbing energy from an impact to a side of the body of an automotive passenger vehicle, said vehicle body comprising a passenger compartment with a floor, at least one set of upstanding opposing passenger side doors at opposite sides of said floor, and at least one passenger seat affixed to said floor between said doors;

an outer tube attached to said vehicle body and having a telescoping inner tube in at least one end of said outer tube, said inner tube having an inner end within said outer tube and an outer end, said inner tube being movable from a retracted position to an extended position with its outer end bearing against said side of said body;

a piston assembly attached to said inner end of said inner tube, said piston assembly having an inclined surface for carrying rolling elements for inertial wedging against the inner surface of said outer tube upon an impact on said side of said body driving said inner tube from said extended position into said outer tube; and means within said outer tube for acting on said piston to move said inner tube from said retracted to said extended position.

2. A beam system as recited in claim 1 comprising a pyrotechnic charge within said outer tube for acting on said piston to move said inner tube from said retracted position to said extended position.

3. A beam system as recited in claim 2 in which said pyrotechnic charge is adapted to be ignited upon an impact to a said passenger side door for acting on said piston to move said inner tube from said retracted position to an extended position against said passenger side door.

4. A beam system as recited in claim 1 in which said piston comprises a truncated conical surface narrowing inwardly of said outer tube, a slotted ball retainer enclosing said conical surface, and a steel ball in each slot of said retainer.

5. A beam system as recited in claim 4 in which said steel balls have a surface hardness such that they plow grooves in the inner surface of said outer tube upon said impact on said side of said body thereby absorbing energy from said impact.

6. A beam system as recited in claim 1 comprising electric actuator means for reversibly moving said inner tube from said retracted position to said extended position.

7. A beam system as recited in claim 6 comprising a microprocessor based control system for said beam system, said control system activating said electric actuator means to move said inner tube to said extended position when said vehicle is being driven and to retract said inner tube when said vehicle is not being driven.

8. A beam system as recited in claim 1 in which said outer tube is a central tube extending between said opposing side doors and comprises a said telescoping inner tube in each end of said outer tube, each inner tube having an outer end adapted to bear against a said opposing door in said extended positions.

9. A beam system as recited in claim 1 in which said outer tube is a central tube extending between a side of a fore/aft tunnel in the floor of said body and the adjacent side door and comprises a telescoping inner tube in each end of said outer tube, one inner tube having an outer end adapted to bear against said tunnel and the other inner tube having an outer end adapted to bear against said adjacent door in said extended positions.

10. A beam system for absorbing energy from a side impact to a side door of the body of an automotive passenger vehicle, said body of said vehicle comprising a passenger compartment floor with at least one set of upstanding opposing passenger side doors at opposite sides of said floor, a pair of passenger seats affixed to said floor between said doors, and a fore/aft tunnel in the floor of said body between said passenger seats, said beam system comprising;

a central outer tube attached to each said seat with a telescoping inner tube in both ends of said outer tube, each said inner tube having an inner end within said outer tube and an outer end, one said inner tube being movable from a retracted position to an extended position with its outer end bearing against one of said side doors and the other inner tube being movable from a retracted position to an extended position with its outer end bearing against said tunnel;

a piston attached to said inner end of each said inner tube, said piston having an inclined surface for carrying rolling elements for inertial wedging against the inner surface of said outer tube upon an impact on said side door driving said inner tube from said extended position into said outer tube; and an actuator within said outer tube for acting on each said piston to move each said inner tube from its said retracted position to its said extended position.

11. A beam system as recited in claim 10 comprising a pyrotechnic charge actuator within said outer tube for generating high pressure gas upon an impact upon said side door to push each said inner tube from its said retracted position to its said extended position.

12. A beam system as recited in claim 10 comprising an electrical actuator within said outer tube for acting on each said piston to move each said inner tube from its said retracted position to its said extended position.

13. A beam system as recited in claim 12 comprising an electrical actuator within said outer tube for acting on each said piston to move said inner tube to said extended position when said vehicle is being driven and to retract said inner tube when said vehicle is not being driven.

14. A method of operating a beam system in a vehicle having an engine and a transmission, and further comprising a passenger compartment with a floor, at least one set of upstanding opposing passenger side doors at opposite sides of said floor, and at least one passenger seat affixed to said floor between said doors;

said beam system being adapted for absorbing energy from an impact to a said side door and comprising an outer tube attached to said a passenger seat, a telescoping inner tube in at least one end of said outer tube, said inner tube having an inner end within said outer tube and an outer end, and an electrical actuator for moving said inner tube from a retracted position to an extended position with its outer end bearing against one of said side doors of said body for absorbing said impact energy;

said method being executed on a microprocessor on said vehicle and comprising:

continually testing, in any order, whether the following vehicle conditions are met: that (i) said side door is closed, (ii) the vehicle engine is running, (iii) the vehicle transmission is not in parking gear and (iv) said seat is not being moved;

commanding said actuator to move said inner tube from said retracted position to said extended position only after determining that each of said conditions are then met; and commanding said actuator to move said inner tube from said extended position to said retracted position when any one of said conditions is not met.

15. A beam system for absorbing energy from an impact to a side of the body of an automotive passenger vehicle, said vehicle body comprising a passenger compartment with a floor, at least one set of upstanding opposing passenger side doors at opposite sides of said floor, at least one passenger seat affixed to said floor between said doors, and a fore/aft tunnel in the floor of said body between two said passenger seats, said beam system comprising;

an outer tube attached to said vehicle body and having a telescoping inner tube in each end of said outer tube, each said inner tube having an inner end within said outer tube and an outer end, one said inner tube being movable from a retracted position to an extended position with its outer end bearing against one of said doors and the other said inner tube being movable from a retracted position to an extended position with its outer end bearing against one of the other side door and said tunnel;

and an actuator within said outer tube for moving each said inner tube to its respective said extended position when said vehicle is being driven and moving each said inner tube to its retracted position when said vehicle is not being driven.

\* \* \* \* \*